United States Patent [19]

Berg et al.

[11] Patent Number: 4,472,528

[45] Date of Patent: Sep. 18, 1984

[54] CATALYST FOR HYDROTREATING SOLVENT REFINED COALS AND LIGNITES

[76] Inventors: Lloyd Berg, 1314 South Third Ave.; Nam K. Kim, 1519 West Koch, both of Bozeman, Mont. 59715

[21] Appl. No.: 438,002

[22] Filed: Dec. 27, 1982

[51] Int. Cl.³ .................. B01J 21/04; B01J 23/88; B01J 27/04

[52] U.S. Cl. .................. 502/220; 502/314; 208/216 PP; 208/254 H

[58] Field of Search .................. 252/439, 465; 208/216 PP, 254 H; 502/220, 314

[56] References Cited

U.S. PATENT DOCUMENTS 4,200,521   4/1980   Stein et al. .................. 208/216 PP
4,326,995   4/1982   Berg et al. .................. 252/465

*Primary Examiner*—W. J. Shine

[57] ABSTRACT

A catalyst for denitrogenating and desulfurizing liquified or solvent refined coals and lignite which includes catalytic metal oxides and/or sulfides impregnated within a porous base of principally alumina with large surface area and pore volume and pores of sufficient diameter throughout to accomodate the liquified coal or lignite molecules. The base material includes surface area of 150–500 m²/gm, pore volume of 0.4–1.0 ml/gm, average pore diameter of 40–250 Å with no part of the pore less than 40 Å. The catalytic metals impregnated into these base materials include 4–20% $MoO_3$, 1–8% CoO, 2–16% $WO_3$ and/or 1–4% NiO.

4 Claims, No Drawings

CATALYST FOR HYDROTREATING SOLVENT REFINED COALS AND LIGNITES

FIELD OF THE INVENTION

This invention relates to a method for catalytically upgrading solvent refined coals (SRC) and lignites (SRL) for the purpose of converting them into transportation quality fuel and/or making them acceptable as a feedstock to a conventional petroleum refinery.

BACKGROUND OF THE INVENTION

The conversion of coal into an essentially ash-free high melting carbonaceous material has received a great deal of investigation and developmental work. Demonstration plants have been designed and constructed for Gulf Oil Company's solvent refined coal process, HRI, Inc.'s H-Coal process and EXXON's donor solvent process. These processes produce a low ash, high melting, high sulfur, high nitrogen containing solid which is useful only as a boiler fuel. These processes are referred to as coal liquefaction.

Less work has been done on the liquefaction of lignite, however, although lignite represents one of the great energy resources of the United States. The principal investigation of the liquefaction of lignite was done at the University of North Dakota under the sponsorship of the U.S. Department of Energy on what was called "Project Lignite". The process design unit had a nominal designed capacity of fifty pounds of lignite feed per hour. It produced approximately fifteen pounds per hour of solvent refined lignite, a solid at room temperature. The solvent refined lignite process produced a high melting solid which is essentially ash-free but contains 0.98% sulfur and 1.07% nitrogen. This material is suitable only as low grade boiler fuel. Its high nitrogen content preclude its use as a substitute for crude oil in conventional petroleum refining. Nitrogen compounds quickly poison the catalysts used in petroleum processing. The presence of sulfur is less objectionable because effective processes for the desulfurization of feedstocks have been developed. In order then to convert solvent refined coals and lignites into feedstocks acceptable to a conventional petroleum refinery, it is essential that a method be found which will remove most of the nitrogen compounds from the solvent refined coals and lignites without changing them greatly otherwise. The purpose of this invention is to show how this can be done. Lignite has also been liquified by the EXXON donor solvent process and by the H-Coal process although in smaller quantities than that from bituminous coals.

DESCRIPTION OF THE PRIOR ART

Coal and lignite are composed of carbon, hydrogen, oxygen, sulfur and nitrogen as well as a sprinkling of mineral matter in the ash. Structurally they are composed chiefly of molecules of condensed aromatic rings of high molecular weight. About 70% of the carbon atoms are estimated to be in the aromatic rings but only about 23% of the hydrogen atoms are attached to aromatic carbon atoms. Hill & Lyon, IND. ENG. CHEM., 54, #6, p.36 (1962) pointed out that it is logical to assume that only about ten or less nuclear rings combine for each aggregate but that the total molecular weight is in the order of 10,000. Stenberg et al, U.S. Dept. of Energy Report FE-2211-9, April 1978 report that solvent refined lignite is composed of a stack of four aromatic planes and an average plane is 15 Angstroms in diameter. The average distance between stacked planes is 3.7 Angstroms. Thus an average solvent refined lignite molecule is a cylinder 15 Angstroms in diameter and 12 Angstroms high. Berg & McCandless, U.S. Dept. of Energy Reports FE-2034-1 to FE-2034-15 investigated more than fifty commercially available hydrotreating catalysts and found none capable of reducing the nitrogen content of solvent refined coals to an acceptable degree. To be useful as a feedstock to a conventional petroleum refinery, solvent refined coals and lignites must contain as little nitrogen as possible and in any event, not more than 0.3%.

A myriad of hydrotreating catalysts have been developed for petroleum up-grading. Desulfurization is the major problem with feedstocks. Denitrogenation has received little attention simply because petroleum usually contains no nitrogen and the few that do have very small amounts. And so the role of hydrotreating catalysts has been to convert the sulfur in petroleum to hydrogen sulfide and any oxygen to water. Supported cobalt and molybdenum on alumina bases are the most common. Frequently nickel and/or tungsten are added as promoters. The carrier, alumina or alumina-silica, serves as the base for the catalytically active metals and it is well known that the large surface area base materials generally make more active catalysts.

Hydrotreating catalysts for petroleum usually operate with little or no carbon lay-down on the catalyst. Any carbon-carbon bonds that are broken appear to become saturated with hydrogen and no deactivation due to carbon formation occurs. When carbon laydown does occur, as in cracking catalysts, the carbon film screens off the active metals preventing further reaction and the catalyst appears to be inactive. The only known way to remove the carbon laid down on the catalyst is a burn-off with oxygen or an oxygen-inert gas mixture. It is necessary to conduct the burn-off in a manner that the physical and chemical structure of the catalyst is not altered. The mistake in carbon burn-off is to cause the temperature to go so high that sintering or fusing occurs and surface area is greatly reduced.

A great many investigators have contributed to the development of catalysts for the upgrading of carbonaceous liquids. Most of the early literature in this field does not distinguish between the source of the carbonaceous liquids grouping them into a single category even though they may have originated from petroleum, bituminous coals, subbituminous coals or lignites. Recent literature has become more precise. Itoh et al, U.S. Pat. No. 4,134,856 gives specific surface area range, pore volume distribution and pore diameter range for the catalyst but apply it to hydrofining in general. Mickelson, U.S. Pat. No. 4,152,251 describes a novel method of putting the active metals on the base material but applies this catalyst to "mineral oils". Heck et al, U.S. Pat. No. 4,267,033 describe a very specific pore volume distribution range but also apply their process to "aromatic petroleum and coal derived liquids". Stein et al, U.S. Pat. No. 4,200,521 limit their process to blends of liquified coals and recycle oil but are not very specific about the properties of the catalyst.

One of the major differences between carbonaceous liquids derived from petroleum and liquified coals or lignites is that the latter contain an appreciable amount of nitrogen compounds, usually about one percent nitrogen. Petroleum fractions and residues are almost always completely devoid of nitrogen and those that do contain nitrogen have very little. To be useful as a transportation grade fuel or a feedstock to a conventional petroleum refinery, the liquified coal or lignite must have its nitrogen content reduced to below 0.3 weight percent.

Berg & McCandless, U.S. Dept. of Energy Reports FE-2034 to FE-2034-15 investigated more than fifty commercially available hydrotreating catalysts and found none capable of reducing the nitrogen content of the liquified coals to an acceptable degree. Berg et al, U.S. Pat. No. 4,326,995 devised a catalyst specifically for solvent refined coals to accomplish this denitrogenation which possessed specific surface area, pore volume, pore diameter range and metal loading.

OBJECTIVE OF THE INVENTION

It is the objective of this invention to provide effective catalysts for the denotrogenation and desulfurization of solvent refined coals and lignites. It is a further object to provide a catalyst for reacting hydrogen with the chemically combined nitrogen in the solvent refined coals and lignites to produce a product having sufficiently low nitrogen content to be acceptable as a transportation grade fuel and/or a petroleum refinery feedstock. It is a further object of the present invention to provide a catalyst for the denitrogenation and desulfurization of solvent refined coals and lignites which can be regenerated by burning off the carbon laydown with an oxygen containing gas. It is a further object of this invention to provide a process for the denitrogenation and desulfurization of solvent refined coals and lignites.

SUMMARY OF THE INVENTION

The objects of this invention are provided by a catalyst, the base of which is a material in the form of pellets and comprises in excess of 80 weight percent alumina with a surface area of 150–500 square meters per gram, a pore volume of 0.4 to 1.0 milliliters per gram and an average pore diameter in the range of 40–250 Angstroms with no part of the pore diameter less than 40 Angstroms; the effective catalytic metal oxides impregnated on this base material include $MoO_3$ 4–20%, CoO 1–8%, NiO 1–4% and $WO_3$ 2–16%. One other aspect of the invention is a method for regenerating the catalyst which comprises burning off the carbon laydown at temperatures of approximately 600° C. in a stream of nitrogen containing one percent to fifty percent oxygen.

DETAILED DESCRIPTION OF THE INVENTION

The prior art has shown a remarkable divergence in the results obtained from petroleum fractions as compared with liquified coals and lignites. Catalysts which are effective in hydrotreating petroleum and its fractions fail miserably when subjected to liquified coals and lignites. This is caused, we believe, by the great difference in chemical structure between these two. Petroleum came from animal sources, coal and lignite from plant sources. Petroleum consists primarily of straight and branched chain paraffins and naphthenes. Naphthenes are alkylated derivatives of cyclopentane and cyclohexane. Using the known values of the carbon-carbon and carbon-hydrogen bond distances, a calculation shows these molecules to be long chains of about 5 to 10 Angstroms in diameter. Coal and lignite was formed by plants. FIG. 1 shows the molecular structure of the major chemical constituents of plants. FIG. 2 shows how the plant chemicals changed as coalification takes place, lignite being the youngest, anthracite the oldest. FIG. 3 shows the current estimate of what comprises a coal molecule. Stenberg, U.S. Dept. of Energy Report FE-2211-9 reported that solvent refined lignite had an average molecular weight of 460 with a range of 100 to 4000. Applying this to the structure of lignite in FIG. 2, the average thickness of the aromatic layers in solvent refined lignite is about 12 Angstroms, a stack of four planes is about 15 Angstroms. Thus a liquified coal or lignite molecule is physically large, probably three to five times as great as molecules from petroleum.

Since the liquified coal or lignite molecules are at least 15–20 Angstroms in diameter, catalysts designed to process them must accomodate this property. An effective catalyst is one that presents the hydrotreating metals on a large surface area. A solid sphere or cube will present the minimum amount of surface area for a given quantity of material and thus would be ineffective as a catalyst. High surface area is attained by providing many pores in the catalyst base material and that is why high surface area and large pore volume are always a vital property of an effective catalyst.

As noted above, we investigated a large number of catalysts possessing large surface area, large pore volume and the right hydrotreating metals and yet they failed to effectively hydrotreat liquified coals and lignites. Why? The answer lies, we believe, in a consideration of the nature of pores. Some materials such as zeolites obtain their pore structure and characteristics from precise cyrstalline structure. When we subjected our successful catalysts to 50,000 magnification in an electron microscope, we found them to be composed of small balls of about 74 Å in diameter. Also shown were the actual pores, the average diameter of which had been measured and shown to be 169 Å. The base material is Katalco #81-6731 alumina with a surface area of 223 square meters per gram, a pore volume of 0.933 milliliters per gram and an average pore diameter of 169 Å. Balls of 74 Å diameter could be stacked to give a pore diameter of 150 Å. If we now coat the pores with the active metal oxides $MoO_3$, CoO, NiO and/or $WO_3$, there is still room for the liquified coal or lignite molecules of 15–20 Å diameter to pass through freely.

FIG. 1 - Molecular Structure of Plant Constituents.

Cellulose

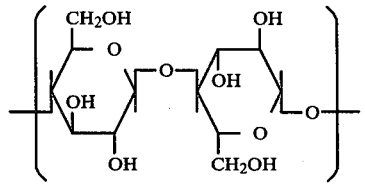

Lignins 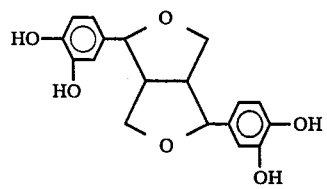
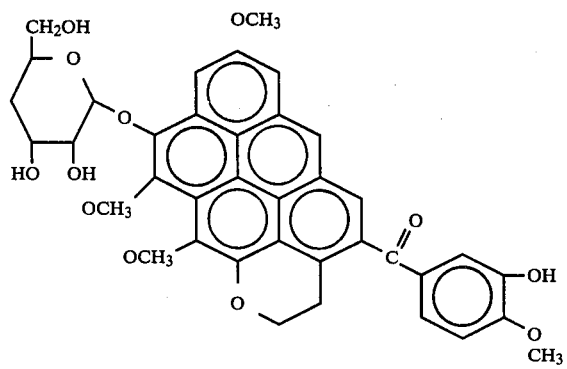
Waxes 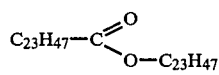
Protein 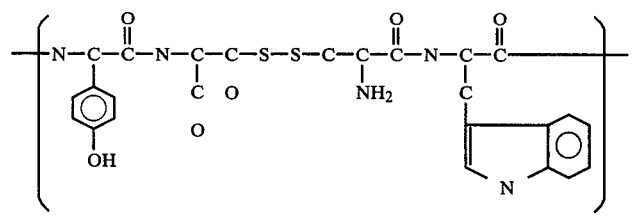
Model of a humic acid 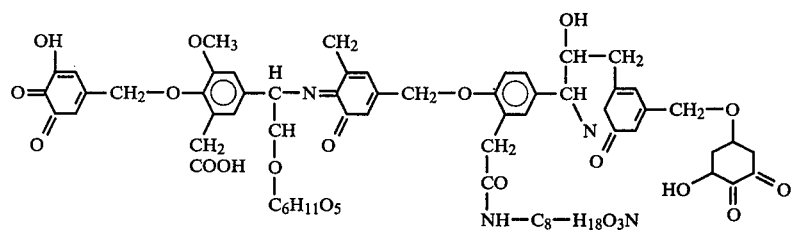
FIG. 2 - Molecular Structure of Coals and Lignite.
Lignite
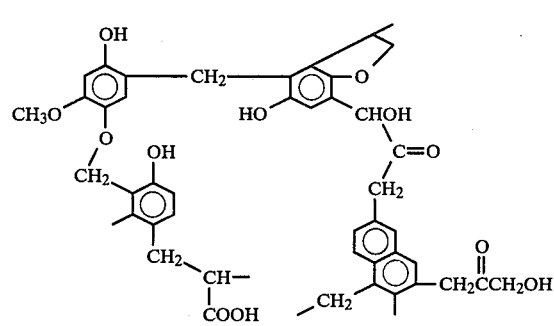
Subbituminous
High-volatile bituminous

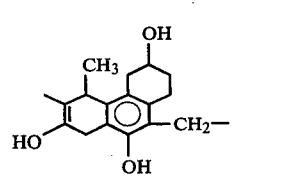
Low-volatile bituminous
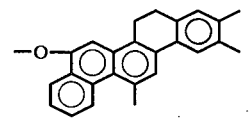
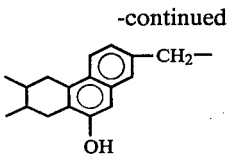
Anthracite
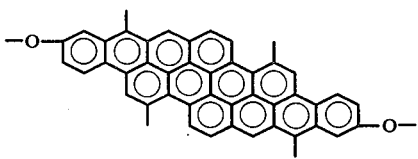
FIG. 3 - Coal macromolecule has this possible structure
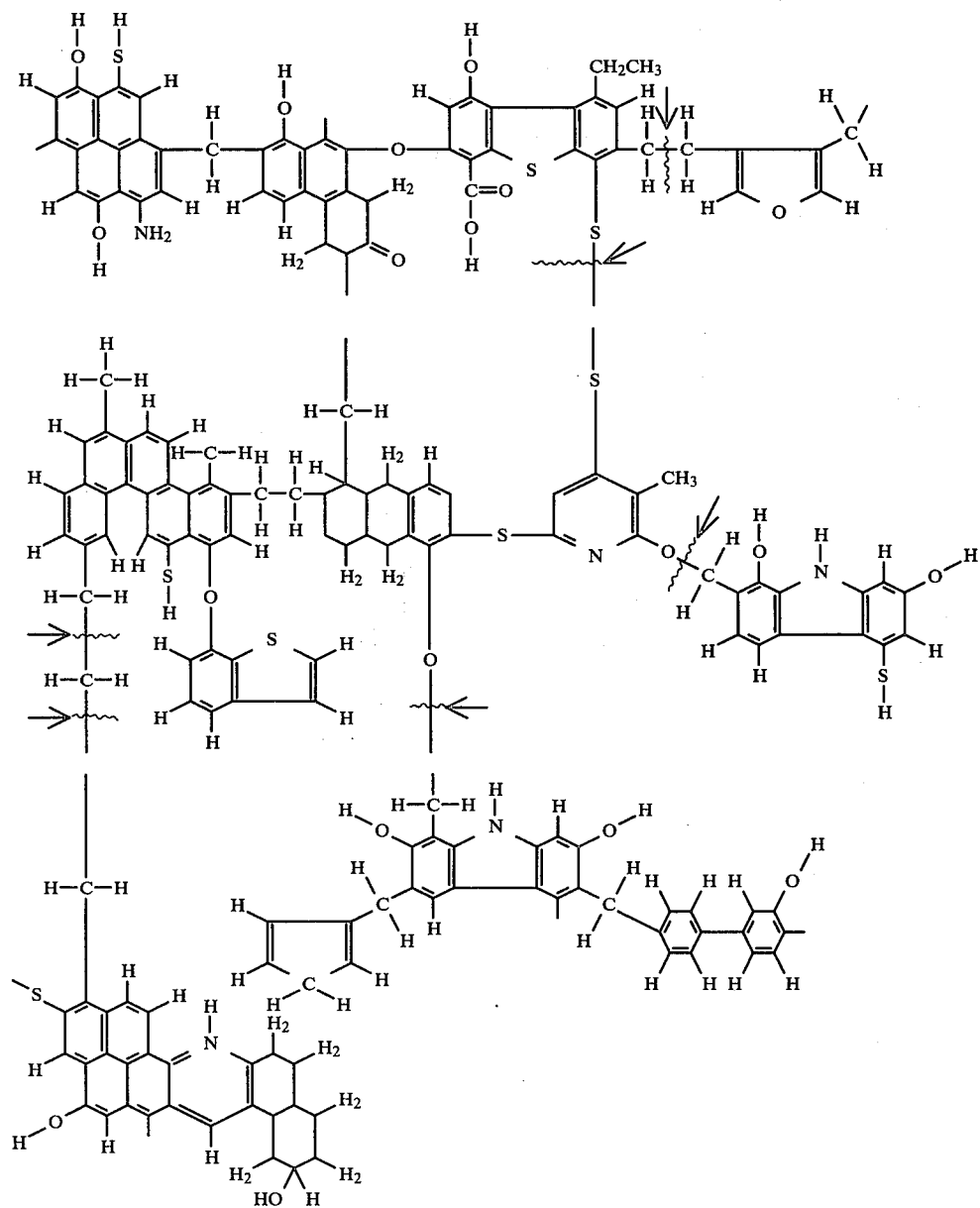
There is still another problem with pores. If they possess constrictions that prevent the free passage of the The active metals are deposited on the catalyst base from aqueous solution by the incipient wetness method. This means that the pores are filled with an aqueous solution of the metal compound, the water evaporated and the metal compound deposited on the walls of the pore. It becomes obvious that the larger part of the pore will contain more aqueous solution and thus get a richer deposit than the narrower portions. This might explain some of the incongruities that occur in the metal loading of catalysts. The same reasoning can be applied to hydrogen diffusion. The wide pore opening on the catalyst surface will allow more hydrogen to diffuse and contain enough hydrogen to supply the demand of the reacting liquid on the active sites. As the pore size is reduced, both the dissolved hydrogen available and the surface area are reduced as well.

How to prove the above assumptions? The answer is to obtain nitrogen containing pure compound having about the same size as that presumed for liquified coal or lignite. We selected nitrocellulose for this purpose. A suitable solvent for nitrocellulose is dibutyl phthalate and the solution of these two was found to contain 0.35 weight percent nitrogen. The average number of anhydroglucose units in the molecule ranged from 500 to 2500. From this the polymer size was estimated to be 15 Å in diameter and 2250 Å to 11250 Å in length.

In order to confirm experimentally the validity of the mechanism described above, five different catalyst base materials were evaluated. Four were prepared and tested in the following manner, the fifth was a Harshaw commercial catalyst. Each catalyst was first of all sulfided at 450° C. for 12 hours in a stream of 10% $H_2S$ in hydrogen. The sulfided catalyst was placed in a trickle bed reactor system. Liquified coal or lignite at a temperature above its melting point was pumped in at a rate of one to three volumes of feed per volume of catalyst. Hydrogen at a rate of 10,000 std. cu. ft. per 42 gallon barrel of liquified coal was introduced into the reactor concurrently. The temperature was 425° C., pressure 1000 psi. Treated product was released through a back pressure valve and samples for analysis taken hourly. These catalysts were designed for their denitrogenation capability and the analysis of nitrogen content was done by the Kjeldahl method. The results are shown in the following examples and summarized in Table I.

EXAMPLE 1

Union Carbide molecular sieve base material was impregnated to give 10% $MoO_3$, 4% CoO and 8% $WO_3$. This base possesses a surface area of 2600 square meters per gram, a pore volume of 0.654 ml/gm., an average pore diameter of 10 Å and a granule size of 6 Å. It was tested in a batch reactor with SYNTHOIL liquified coal for one hour. Analysis showed a denitrogenation of 3%. Another portion of the same catalyst was placed in the trickle bed reactor and a solution of nitrocellulose in dibutyl phthalate containing 0.35% nitrogen was pumped in. Analysis of product showed as percent denitrogenation: after 1 hour, 93.3%; after 3 hours, 33.3%; after 8 hours, 25.7%. Comment: with an average pore diameter of only 10 Å, this catalyst would be expected to work poorly with the larger diameter molecules of the liquified coal and the nitrocellulose. It did.

EXAMPLE 2

A gamma alumina base, Ketjen's LA-3P, possessing a surface area of 410 sq. meters/gm, a pore volume of 0.68 ml/gm, an average pore diameter of 55 Å and a granule size of 38 Å was impregnated with the same concentration of $MoO_3$, CoO and $WO_3$ as that in example 1. Solvent Refined Coal (SRC) prepared from Kentucky No. 9 coal in Pittsburg & Midway Coal Co.'s Tacoma pilot plant was pumped into the trickle bed reactor. Analysis of the product for percent denitrogenation showed: after 1 hour, 17%; after 2 hours, 19%; after 3 hours, 0%. Another portion of the same catalyst was placed in the trickle bed reactor and the nitrocellulose-dibutyl phthalate solution pumped in. Analysis of product as percent denitrogenation: after 1 hour, 99.5%; after 3 hours, 96.7%; after 8 hours, 64.3%. Comment: much of the pore diameter must be too small to accomodate the SRC molecules because of the rather poor showing of the nitrocellulose with this catalyst.

EXAMPLE 3

A gamma alumina base, Katalco's 81-6731 possessing a surface area of 207 sq. meters/gm, a pore volume of 0.933 ml/gm, an average pore diameter of 168 Å and a granule size of 74 Å was impregnated with the same concentration of $MoO_3$, CoO and $WO_3$ as that in example 1. Solvent Refined Lignite (SRL) prepared from Zap, ND. lignite in the UND, Grand Forks, ND. pilot plant under DOE Project Lignite, was pumped into the trickle bed reactor. Analysis of the product for percent denitrogenation showed: after 1 hour, 97.8%; after 2 hours, 93.5%; after 3 hours, 63%; after 4 hours, 56.5%; after 5 hours, 52.2% and after 8 hours, 37%. Another portion of the same catalyst was placed in the trickle bed reactor and the nitrocellulose-dibutyl phthalate solution pumped in. Analysis of this product as percent denitrogenation was: after 1 hour, 99.5%; after 3 hours, 96.2% and after 8 hours, 65.2%. Comment: the average pore diameter of 169 Å is large enough that this could be a good base. However, both the nitrocellulose and the solvent refined lignite show it to lose its denitrogenation capability rather quickly indicating that not all of the surface area lies in pores that these compounds can reach.

EXAMPLE 4

A gamma alumina base, Nalco's A-78-6008 possessing a surface area of 337 sq. meters/gm, a pore volume of 0.72 ml/gm, an average pore diameter of 89 Å and a granule size of 46 Å was impregnated with the same concentration of $MoO_3$, CoO and $WO_3$ as that in example 1. The solvent refined lignite from Zap, ND. lignite was pumped into the trickle bed reactor. Analysis of the product for percent denitrogenation showed: after 1 hour, 94.7%; after 2 hours, 94.7%; after 3 hours, 94.7%; after 4 hours, 89.2% and after 5 hours, 73%. Another portion of the same catalyst was placed in the trickle bed reactor and the nitrocellulose-dibutyl phthalate solution pumped in. Analysis of this product as percent denitrogenation was: after 2 hours, 99%; after 4 hours, 99.5% and after 8 hours, 98.1%. Comment: here is a catalyst in which almost all of the pore volume accomodates both solvent refined lignite molecules and the nitrocellulose molecules. The diameter of the pores is always large enough that the large molecules can reach any point in them and all of the surface area is thus available for denitrogenation.

EXAMPLE 5

A gamma alumina base, Harshaw's No. 0401 cobalt molybdate catalyst, that had been impregnated with 9% $MoO_3$ and 3% CoO and possessing a surface area of 160 sq. meters/gm, a pore volume of 0.4 ml/gm, an average pore diameter of 100 Å and a granule size of 96 Å was treated with the same solvent refined coal (SRC) used in example 2 and under the same conditions as the previous examples. Analysis of the product for percent denitrogenation showed: after 1 hour, 95%; after 2 hours, 94%; after 3 hours, 86%; after 4 hours, 78% and after 5 hours, 73%. Another portion of the same catalyst was placed in the trickle bed reactor and the nitrocellulose-dibutyl phthalate solution pumped through under the same conditions as the previous examples. Analysis of this product as percent denitrogenation was: after 1 hour, 99.5%; after 3 hours, 91.9% and after 8 hours, 91.1%. Comment: the nitrocellulose testing indicates that this catalyst should be as effective as the Nalco based catalyst used in example 4. The result with the solvent refined coal confirms this with the catalyst giving very high denitrogenation.

The results of the five examples listed above are summarized in Table I. With the nitrocellulose, we have a nitrogenous compound of known molecular dimension. We have a series of catalysts that should be effective if their pore structure is suitable to accomodate large molecules. The Union Carbide molecular sieve average pore diameter is so small, only 10 Å, that most of its surface area should be out of range for both the nitrocellulose and the liquified coal or lignite. The results shown in example 1 and in Table I confirm this; it does poorly with both. The other four catalysts have a sufficiently high average pore diameter that they might be expected to be effective. The nitrocellulose shows that the Ketjen and Katalco based catalysts described in examples 2 and 3 are not very effective. When these catalysts are employed with liquified coal (SRC) and liquified lignite (SRL), they do poorly also. This confirms that although the average pore diameter is large enough, there are enough constrictions in the pores to block out much of the surface area from the large nitrogenous molecules. The nitrocellulose denitrogenation with the Nalco A and the Harshaw 0401 based catalysts is excellent as shown in examples 4 and 5 and when these catalysts are used with liquified coal (SRC) and liquified lignite (SRL), they are also excellent. This indicates that with these catalysts the pore diameter throughout the whole pore is large enough to accomodate molecules as large as nitrocellulose, solvent refined coal and solvent refined lignite. Thus all of the surface area is being employed. The data presented in examples 1 to 5 and in Table I show that when dealing with large molecules it is not sufficient to have the proper hydrotreating metals, a large surface area, a large pore volume and a large average pore diameter. A catalyst may have all of these and still fail. One more specification is necessary, namely that the pores must be large enough throughout most of their length to accomodate molecules of the size being treated.

TABLE I

Summary of Runs Described in Examples 1 to 5.

| Catalyst Name | Union Carbide 13X | Ketjen LA-3P | Katalco 81-6731 | Nalco A 78-6008 | Harshaw CoMo 0401 |
|---|---|---|---|---|---|
| Carrier Material | Molecular sieve | gamma-Alumina | gamma-Alumina | gamma-Alumina | gamma-Alumina |
| Pore Volume, ml/gm | 0.654 | 0.68 | 0.933 | 0.72 | 0.40 |
| Pore Diameter, average, Å | 10 | 55 | 169 | 89 | 100 |
| Surface area, $m^2$/gm | 2600 | 410 | 207 | 337 | 160 |
| Granule size, Å, diam. | 6 | 38 | 74 | 46 | 96 |
| Metals Impregnated | | | | | |
| $MoO_3$, wt. % | 10 | 10 | 10 | 10 | 9 |
| CoO, wt. % | 4 | 4 | 4 | 4 | 3 |
| $WO_3$, wt. % | 8 | 8 | 8 | 8 | 0 |
| Feed | SYNTHOIL | SRC | SRL | SRL | SRC |
| Wt. % Denitrogenation, | | | | | |
| 1 hr. | 3 | 17 | 97.8 | 94.7 | 95 |
| 2 hr. | | 19 | 93.5 | 94.7 | 94 |
| 3 hr. | | 0 | 63.0 | 94.7 | 86 |
| 4 hr. | | | 56.5 | 89.2 | 78 |
| 5 hr. | | | 52.2 | 73.0 | 73 |
| 8 hr. | | | 37.0 | | |
| Feed: Nitrocellulose | | | | | |
| Wt. % Denitrogenation, | | | | | |
| 1 hr. | 93.3 | 99.5 | 99.5 | — | 99.5 |
| 2 hr. | — | — | — | 99.0 | — |
| 3 hr. | 33.3 | 96.7 | 96.2 | — | 91.9 |
| 4 hr. | — | — | — | 99.5 | — |
| 8 hr. | 25.7 | 64.3 | 65.2 | 98.1 | 91.1 |

We claim:

1. In a catalyst for the hydrogenation, desulfurization and denitrogenation of carbonaceous liquids produced by the solvent refining of coals and lignites containing about 0.98% sulfur and about 1.07% nitrogen, said catalyst having an alumina base material that includes a surface area in the range of 160–337 square meters per gram, a pore volume in the range of 0.4–0.72 milliliters per gram, an average pore diameter in the range of 89–100 Angstroms, deposited catalytic oxides in the range of approximately 8–10% $MoO_3$, 3–4% CoO and 8–10% $WO_3$, the improved combination comprising a base material with deposited catalytic metal oxides having a pore configuration which is accessible to nitrocellulose molecules as determined by the hydrodenitrogenation of nitrocellulose in dibutyl phthalate.

2. The catalyst of claim 1 in which the catalyst is pretreated with a hydrogen sulfide-hydrogen mixture at a temperature of about 450° C.

3. In a catalyst for the hydrogenation, desulfurization and denitrogenation of carbonaceous liquids produced by the solvent refining of coals and lignites containing about 0.98% sulfur and about 1.07% nitrogen, said catalyst having an alumina base material that includes a surface area in the range of 160–337 square meters per gram, a pore volume in the range of 0.4–0.72 milliliters per gram, an average pore diameter in the range of 89–100 Angstroms, deposited catalytic oxides in the range of approximately 8–10% $MoO_3$ and 3–4% CoO, the improved combination comprising a base material with deposited catalytic metal oxides having a pore configuration which is accessible to nitrocellulose molecules as determined by the hydrodenitrogenation of nitrocellulose in dibutyl phthalate.

4. The catalyst of claim 3 in which the catalyst is pretreated with a hydrogen sulfide-hydrogen mixture at a temperature of about 450° C.

* * * * *